May 8, 1923.
W. O. EWINGER
1,454,470
NATURAL WATER COOLING DEVICE
Filed Feb. 8, 1921
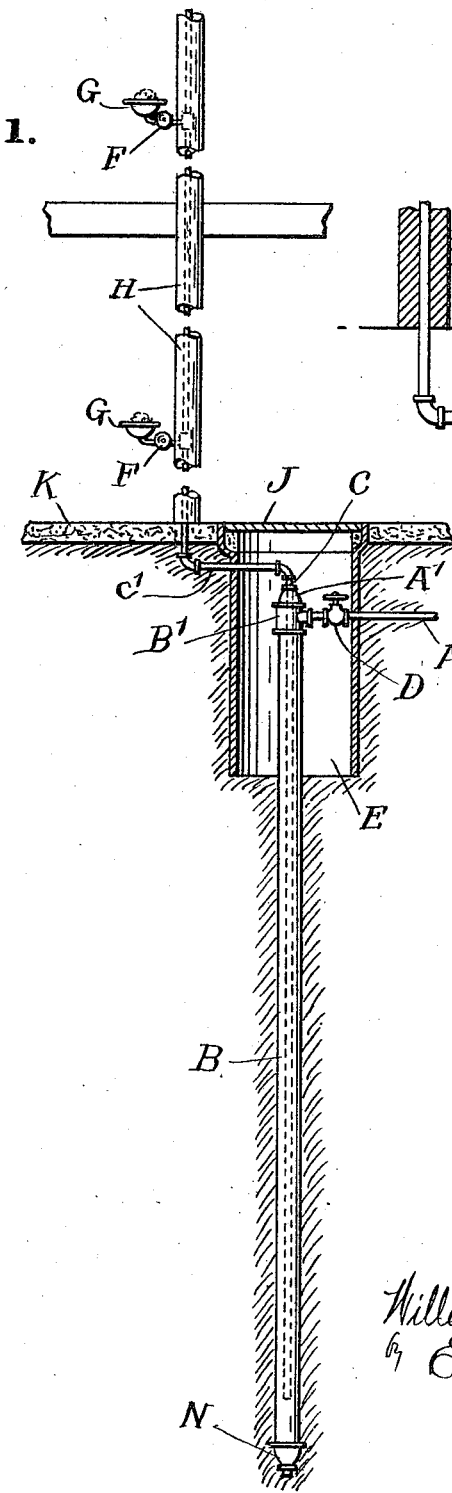
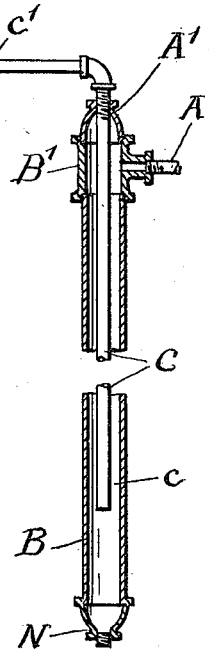
Inventor:
William O. Ewinger
by E. D. Anderson
Attorneys.

Patented May 8, 1923.

1,454,470

UNITED STATES PATENT OFFICE.

WILLIAM O. EWINGER, OF BURLINGTON, IOWA.

NATURAL WATER-COOLING DEVICE.

Application filed February 8, 1921. Serial No. 443,321.

*To all whom it may concern:*

Be it known that I, WILLIAM O. EWINGER, a citizen of the United States, resident of Burlington, in the county of Des Moines and State of Iowa, have made a certain new and useful Invention in Natural Water-Cooling Devices; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, partly broken away.

Figure 2 is a detail central longitudinal section of the tubular casing.

The invention has relation to means for furnishing a continuous supply of cool water without the use of ice or artificial refrigeration, applicable to any water system wherein there is a head or pressure of water, and capable of furnishing a continuous flow of water at all times at a temperature of about 65 degrees Fahrenheit without any attention whatever after the first installation. Other advantages or objects will apear.

The invention consists in the novel construction and combinations of parts, as hereinafter set forth.

In the accompanying drawings illustrating the invention, the letter A designates a supply or service pipe of a water system, such for instance as that of a city or town having a sufficient head or pressure of water to supply the same to the upper as well as the lower floors of tall buildings; B is a vertical pipe of iron or other metal, extending downwardly to a depth sufficient to cool water in the lower part of said pipe to a temperature of about 65 degrees Fahrenheit, and extending upwardly to near the surface of the ground or floor K, said pipe being usually of 35 feet in length approximately, and being at its upper portion provided with a T-joint B' wherein the end of the pipe A is threaded, and at its lower end with a plug N.

A plug A' is threaded into the upper end of the T-joint B', and has an upper reduced aperture, wherein is threaded a vertical pipe C which extends downwardly within the pipe B to near the bottom thereof, the diameter of the pipe C being sufficiently smaller than that of the pipe B to leave an annular water chamber $c$ between the two pipes and at the lower portion of the larger pipe, said chamber being in communication with the pipe A, and being thereby kept filled with water, a suitable valve D being provided in the service pipe to cut off the water supply or to regulate it as may be desired.

The upper portion of the pipe B including the T-joint B', the plug A', and the valve D, are located in a tubular pit or well E, provided with a cover J, and are thereby made accessible at all times for examination and repair, should such be needed.

The pipe $c$ is provided with a bend or bends $c'$, extending horizontally beneath the ground or floor K to insulation or nonheat conducting vertical tubes or casings H, extending from the floor K upwardly to all or any of the floors of a building, and wherein the pipe $c$ is extended, being at each floor provided with a valve F, and a suitable drinking fountain or other means of obtaining the cool water for drinking purposes and designated G, the adjustment of the valve F controlling the supply of water to said fountain.

The invention is found in practice to work satisfactorily and to furnish an economical supply of cool water, at a temperature which is grateful and preferable to that of ice water.

This invention will supply cool water above the supply source to a height of 20 feet for every $7\frac{1}{2}$ pounds hydrostatic pressure.

I claim:—

A water cooling device, comprising inner and outer substantially concentric vertical pipes spaced apart from each other and one of which is an inlet and the other an outlet pipe and both of which are embedded in the ground, an enlarged tubular casing embedded in the ground and inclosing the upper ends of the said inlet and outlet pipes and being comparatively short, and inlet and outlet feed pipes connected to said inner and outer vertical pipes within said enlarged casing, the latter being provided with a removable cover, and said inlet feed pipe being provided with a cut-off valve located within said enlarged casing.

In testimony whereof I affix my signature in presence of two witnesses.

WILLIAM O. EWINGER.

Witnesses:
H. A. AMBLER,
EDITH CHRISTIANSEN.